(12) United States Patent
Christensen

(10) Patent No.: US 7,942,634 B2
(45) Date of Patent: May 17, 2011

(54) WIND TURBINE, A METHOD FOR COMPENSATING FOR DISPARITIES IN A WIND TURBINE ROTOR BLADE PITCH SYSTEM AND USE OF A METHOD

(75) Inventor: Poul Brandt Christensen, Ry (DK)

(73) Assignee: Vestas Wind Systems A/S, Randers SV (DK)

( * ) Notice: Subject to any disclaimer, the term of this patent is extended or adjusted under 35 U.S.C. 154(b) by 0 days.

(21) Appl. No.: 12/687,671

(22) Filed: Jan. 14, 2010

(65) Prior Publication Data

US 2010/0117361 A1 May 13, 2010

Related U.S. Application Data

(63) Continuation of application No. PCT/DK2008/000263, filed on Jul. 11, 2008.

(51) Int. Cl.
*F03D 7/00* (2006.01)
(52) U.S. Cl. .............. 416/1; 416/35; 416/37; 416/39; 416/61; 29/44; 29/55
(58) Field of Classification Search .............. 416/1, 35, 416/37, 39, 61; 29/44, 55
See application file for complete search history.

(56) References Cited

U.S. PATENT DOCUMENTS

| | | | |
|---|---|---|---|
| 4,189,648 A | 2/1980 | Harner | |
| 4,426,192 A | 1/1984 | Chertok et al. | |
| 5,289,041 A * | 2/1994 | Holley | 290/44 |
| 6,137,187 A * | 10/2000 | Mikhail et al. | 290/44 |
| 2004/0057828 A1* | 3/2004 | Bosche | 416/1 |

FOREIGN PATENT DOCUMENTS

| | | |
|---|---|---|
| EP | 1870596 A2 | 12/2007 |
| EP | 1956236 A1 | 8/2008 |
| EP | 2000667 A1 | 12/2008 |
| JP | 2006037850 A | 2/2006 |
| WO | 0133075 A1 | 5/2001 |
| WO | 2004074681 A1 | 9/2004 |

(Continued)

OTHER PUBLICATIONS

Tor Ben Juul Larsen et al: "Active load reduction using individual pitch, based on local blade flow measurements" Wind Energy, Wiley, Chichester, GB, vol. 8, No. 1, Dec. 16, 2004, pp. 67-80, XP002504578 ISSN: 1099-1824 chapter "Individual Pitch Regulation based on Flow Measurement".

(Continued)

*Primary Examiner* — Igor Kershteyn
(74) *Attorney, Agent, or Firm* — Wood, Herron & Evans, LLP

(57) ABSTRACT

A wind turbine includes a rotor having one or more rotor blades, a pitch system for controlling the pitch angle of the one or more rotor blades, the pitch system having at least one pitch actuator, a pitch controller for generating pitch actuator control signals and sensor elements for establishing values of pitch performance parameters, and a compensation controller to compensate for disparities between the pitch actuator control signals and the values of pitch performance parameters, according to a control algorithm. The compensation controller is arranged to adjust parameters of the control algorithm of the compensation controller in dependency of the disparities.

14 Claims, 6 Drawing Sheets

FOREIGN PATENT DOCUMENTS

| | | |
|---|---|---|
| WO | 2007123552 A1 | 11/2007 |
| WO | 2008119351 A2 | 10/2008 |

OTHER PUBLICATIONS

Danish Search Report; PA 2007 01048; Feb. 26, 2008; 1 page.
Bossanyi E A: "Individual Blade Pitch Control for Load Reduction" Wind Energy, Wiley, Chichester, GB, vol. 6, Oct. 8, 2002, pp. 119-128, XP008031928 ISSN: 1099-1824 chapters "Control Algorithms", "The LOG Controller" and Figure 1.
International Search Report and Written Opinion of the International Searching Authority; PCT/DK2008/000263; Jun. 5, 2009; 14 pages.
Bossanyi E A: "The Design of Closed Loop 1-4,6-15 Controllers for Wind Turbines"Wind Energy, Wiley, vol. 3, No. 3, Jan. 1, 2000, pp. 149-163, XP007908706 ISSN: 1095-4244 [retrieved on Jul. 19, 2001] pp. 158-161; figure 4.

\* cited by examiner

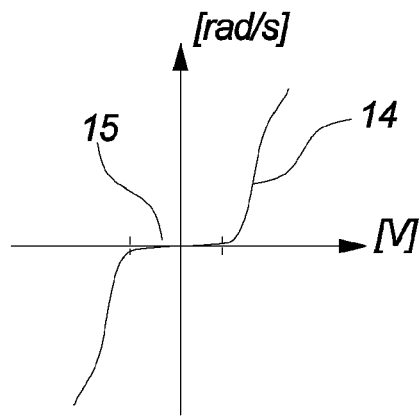 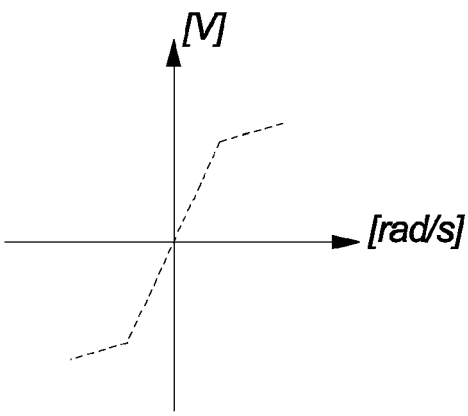
Fig. 4a    Fig. 4b
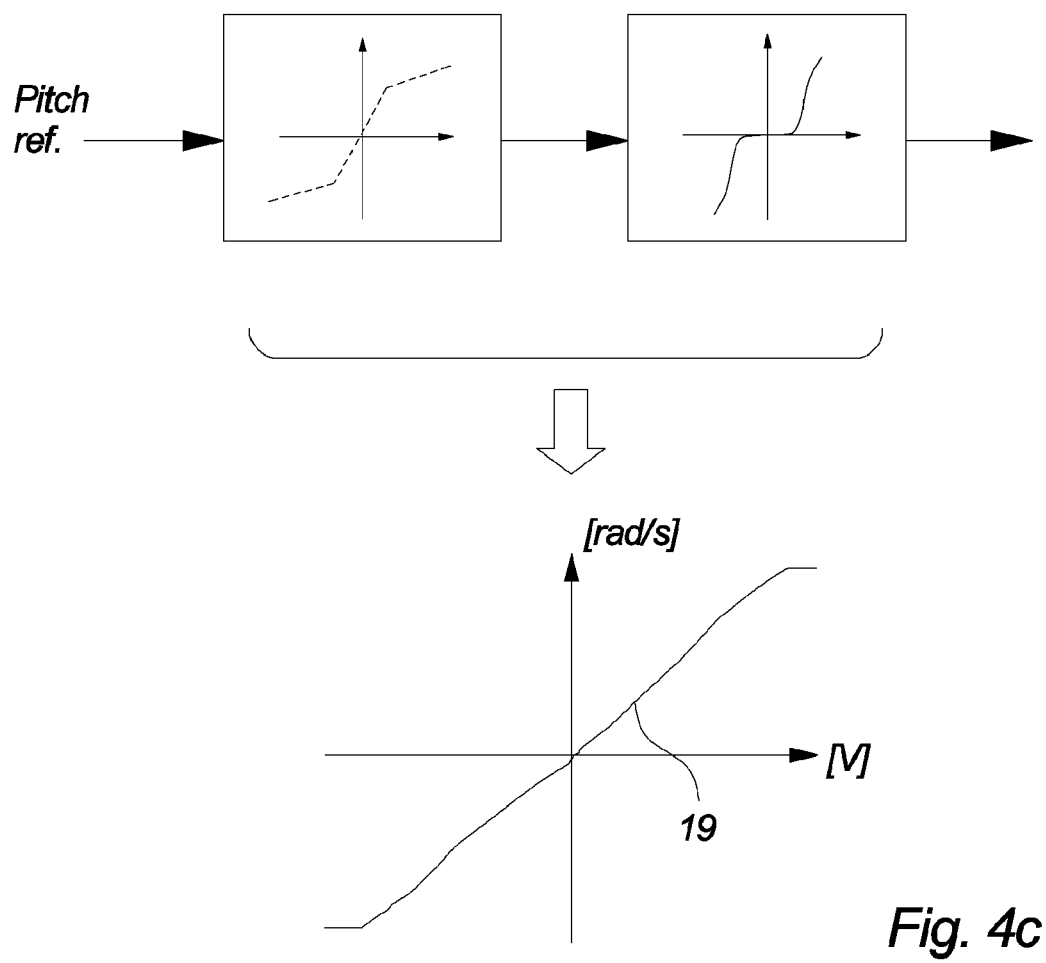
Fig. 4c

WIND TURBINE, A METHOD FOR COMPENSATING FOR DISPARITIES IN A WIND TURBINE ROTOR BLADE PITCH SYSTEM AND USE OF A METHOD

CROSS-REFERENCE TO RELATED APPLICATIONS

The present application is a continuation of pending International patent application PCT/DK2008/000263 filed on Jul. 11, 2008 which designates the United States and claims priority from Danish patent application PA 2007 01048 filed on Jul. 14, 2007, the content of which is incorporated herein by reference.

FIELD OF THE INVENTION

The present invention relates to a wind turbine comprising a rotor including one or more rotor blades, a method for compensating for disparities in a wind turbine rotor blade pitch system and use of a method.

BACKGROUND OF THE INVENTION

Pitch actuators for controlling the pitch angle of one or more rotor blades of a wind turbine are widely known within the technical field.

Each rotor blade is influenced by disparities e.g. due to production variations in the actuator, various tolerances pitch actuator components, variations in blade bearing friction e.g. originating from mounting differences, from temperature variations or from blade deflection variations, variations in air density, wind condition yaw error, wind shear, temperature changes, alternating wind speeds etc. The pitch system may therefore be regarded as a non-linear system with varying parameters.

One problem of said system is that said varying parameters may result in a deteriorated control of the rotor blades and in turn unnecessary fatigue in the wind turbine.

It is an object of the present invention to provide an advantageous method of controlling one or more pitch actuators of a wind turbine without the above mentioned disadvantages.

SUMMARY OF THE INVENTION

The present invention relates to a wind turbine comprising
a rotor including one or more rotor blades,
a pitch system for controlling the pitch angle of said one or more rotor blades, said pitch system comprises at least one pitch actuator, a pitch controller for generating pitch actuator control signals and sensor elements for establishing values of pitch performance parameters, and
a compensation controller to compensate for disparities between said pitch actuator control signals and said values of pitch performance parameters, according to a control algorithm,
wherein
the compensation controller is arranged to adjust parameters of the control algorithm of said compensation controller in dependency of said disparities.

By the term "pitch system" is meant linked components required for realizing pitch activity comprising power supply, power controlling elements, actuators, data processing elements including programmable electronics, sensor elements and data transmission elements.

By the term "disparities" is meant disparities that affect the relationship between actuator control signals and pitch performance parameters i.e. differences between specified/expected and measured/estimated parameters.

By compensating for said disparities it is ensured that any deviation in relation to a desired performance, e.g. due to production variations in the actuator, hydraulic valve tolerances, change in viscosity of hydraulic fluid, variations in blade bearing friction e.g. originating from mounting differences, from temperature variations or from blade deflection variations, variations in air density, wind condition yaw error, wind shear etc., is compensated. Also deviations in relation to electric pitch systems are compensated.

Furthermore it is ensured that permanent disparities, slow changing disparities e.g. related to temperature changes and/or faster changing disparities such as with average wind speed can be compensated.

Even further by compensating it is ensured that important wind turbine performance criteria such as thrust wise tower loads, drive train loads, pitch system loads, actuator wear etc. are minimized, further ensuring an optimal power production and prolonged life time for various wind turbine components.

Another advantage is that optimal compensation can be achieved for different operating conditions and with different load disturbances.

In one aspect of the invention, said compensation controller comprises at least one adaptive controller with adjustable parameters. By adaptively adjusting operational parameters of the compensation controller during operation it is ensured, that any deviation in relation to a desired performance, e.g. due to production variations in the actuator, hydraulic valve tolerances, change in viscosity of hydraulic fluid, variations in blade bearing friction e.g. originating from mounting differences, from temperature variations or from blade deflection variations, variations in air density, wind condition yaw error, wind shear etc., is compensated effectively.

In another aspect of the invention, said at least one adaptive controller further comprises means for adjusting said parameters.

In a further aspect of the invention, said compensation controller comprises a Self Tuning Regulator (STR). By using a STR it is ensured that a regulator is used that can solve online optimization control problems and that the controller parameters are automatically tuned to obtain the desired properties of the system. Moreover, an STR requires little system-specific tuning as it uses a dynamically estimated model of the system and the control law automatically adapts to system and workload dynamics.

In one aspect of the invention, said STR comprises means for processing a non-recursive algorithm for process model parameter estimation such as a Least Square (LS) algorithm or an Extended Least Square (ELS) algorithm.

In another aspect of the invention, said STR comprises means for processing a recursive algorithm for process model parameter estimation such as a Recursive Least Square (RLS) algorithm, a Recursive Extended Least Square (RELS) algorithm, a Recursive Maximum Likelihood (RML) algorithm, a Stochastic Approximation (STA) algorithm etc.

In a further aspect of the invention, said STR comprises means for processing a control design model such as a LQ tracking optimal control method, a input-output pole placement design method etc.

In an even further aspect of the invention, said compensation controller is a Model Reference Adaptive System (MRAS). By using a MRAS it is ensured that a feedback control law that changes the structure and dynamics of the pitch system is implemented so that its properties are substantially the same as those of a desired reference model whereby said disparities of the pitch system can be minimized.

In another aspect of the invention, said MRAS comprises means for processing a real-time parameter updating using a MIT method, a Lyapunov method etc. It is hereby ensured that a reliable method for real-time parameter updating can be implemented, resulting in optimized performance of the pitch system.

In a further aspect of the invention, said pitch actuator is a hydraulic pitch actuator. Hereby it is ensured that the pitch system is compensated for dynamic non-linearity and the non-linear deadband range of a hydraulic pitch actuator comprising e.g. if values of the deadband range changes, such as upper and lower limits, slope of pitchrate/voltage etc.

In one aspect of the invention, the compensation controller is arranged to adjust said parameters of the control algorithm continuously. It is hereby ensured that operational parameters of the compensation controller substantially always are at values optimal for said controller, and that the performance of the pitch system always is optimal regardless of changing working conditions for the pitch system.

In another aspect of the invention, said one or more operational parameters of said compensation controller can be changed for a fixed period of time or changed until a defined error parameter is below a predefined level. It is hereby ensured that the operational parameters of the compensation controller are only changed when it is needed in order to optimize the performance of the pitch system, and/or are only changed for a fixed period of time e.g. during start up, at service, at changing weather conditions etc.

In another aspect of the invention, the change of said one or more operational parameters of said compensation controller can be initiated manually, such as at installation, at service, at changing environmental conditions etc. or automatically such as scheduled at predefined time intervals. It is hereby ensured that at various situations where it may be desirable to alter said operational parameters from one set to another, it can be done directly or initiated manually e.g. via a connected SCADA-connection.

In a further aspect of the invention, said compensation controller is operating within a deadband range of a pitch actuator. Hereby it is ensured that the pitch system is compensated for the non-linear deadband range of e.g. a hydraulic pitch actuator comprising if values of the deadband range changes, such as upper and lower limits, slope of pitchrate/voltage etc. are alternated.

In yet another aspect of the invention, said compensation controller is operating within a variable range of a pitch actuator.

In one aspect of the invention, said compensation controller is compensating for disparities of a hydraulic pitch system. It is hereby ensured that hydraulic pitch systems as widely used in connection to wind turbines, can draw advantage of the present invention. It is furthermore ensured that disparities between more than one hydraulic pitch system can be compensated due to static or slow varying parameters such as differences in production, alternating mounting, ageing of hydraulic liquid etc.

In another aspect of the invention, said compensation controller is compensating for disparities of an electric pitch system. It is hereby ensured that disparities of operational parameters specific for an electric pitch system such as drifting gain of controller, non-linearity of an electric pitch actuator, differences between characteristics of pitch systems for each rotor blade etc. are compensated.

In yet another aspect of the invention, said compensation controller is further arranged to adjust said parameters of the control algorithm in dependency of environmental values such as temperature and wind velocity. It is hereby ensured that environmental parameters that may influence on the operation of e.g. the hydraulic part of the pitch actuator, is compensated for.

In a further aspect of the invention, said compensation controller is further arranged to adjust said parameters of the control algorithm in dependency of pitch performance parameters such as pitch rate and pitch force. Hereby it is ensured that a direct measure of the performance of the pitch system is obtained and that a valid basis for the compensation controller is available. It is furthermore ensured that any deviation between expected and actual performance parameter can be monitored resulting in a following compensation.

In another aspect of the invention, said compensation controller is arranged to adjust said parameters of the control algorithm in dependency of estimated pitch performance parameters. It is hereby ensured that the adaptive controller requires no a priori information regarding the controlled system and is still able to choose the optimal structure and parameters of the adaptive algorithms.

In one aspect of the invention, said wind turbine is a variable speed wind turbine.

The invention also relates to a method for compensating for disparities in a wind turbine rotor blade pitch system, said pitch system comprises at least one pitch actuator, a pitch controller, sensor elements and a compensation controller, said method comprises the steps of:

generating pitch actuator control signals by said pitch controller establishing values of pitch performance parameters of said pitch actuator by said sensor elements, adjusting parameters of a control algorithm of said compensation controller in dependency of disparities between said generated pitch actuator control signals and said established values of pitch performance parameters.

Hereby is provided an advantageous method of controlling one or more pitch actuators of a wind turbine.

In another aspect of the invention, said adjusting parameters of a control algorithm is performed by an adaptive controller. A further advantageous method of controlling one of more pitch actuators of a wind turbine is hereby ensured.

Furthermore the invention relates to use of a method in a wind turbine, wherein said wind turbine is a variable speed wind turbine.

BRIEF DESCRIPTION OF THE DRAWINGS

The invention will be described in the following with reference to the figures in which FIG. 4a illustrates schematically a response characteristic of a hydraulic pitch actuator system, FIG. 4b illustrates schematically a gain compensating curve according to various embodiments of known technique, FIG. 4c illustrates schematically a compensated hydraulic response characteristic of a pitch system according to various embodiments of known technique.

DETAILED DESCRIPTION OF THE INVENTION

Figure 1:
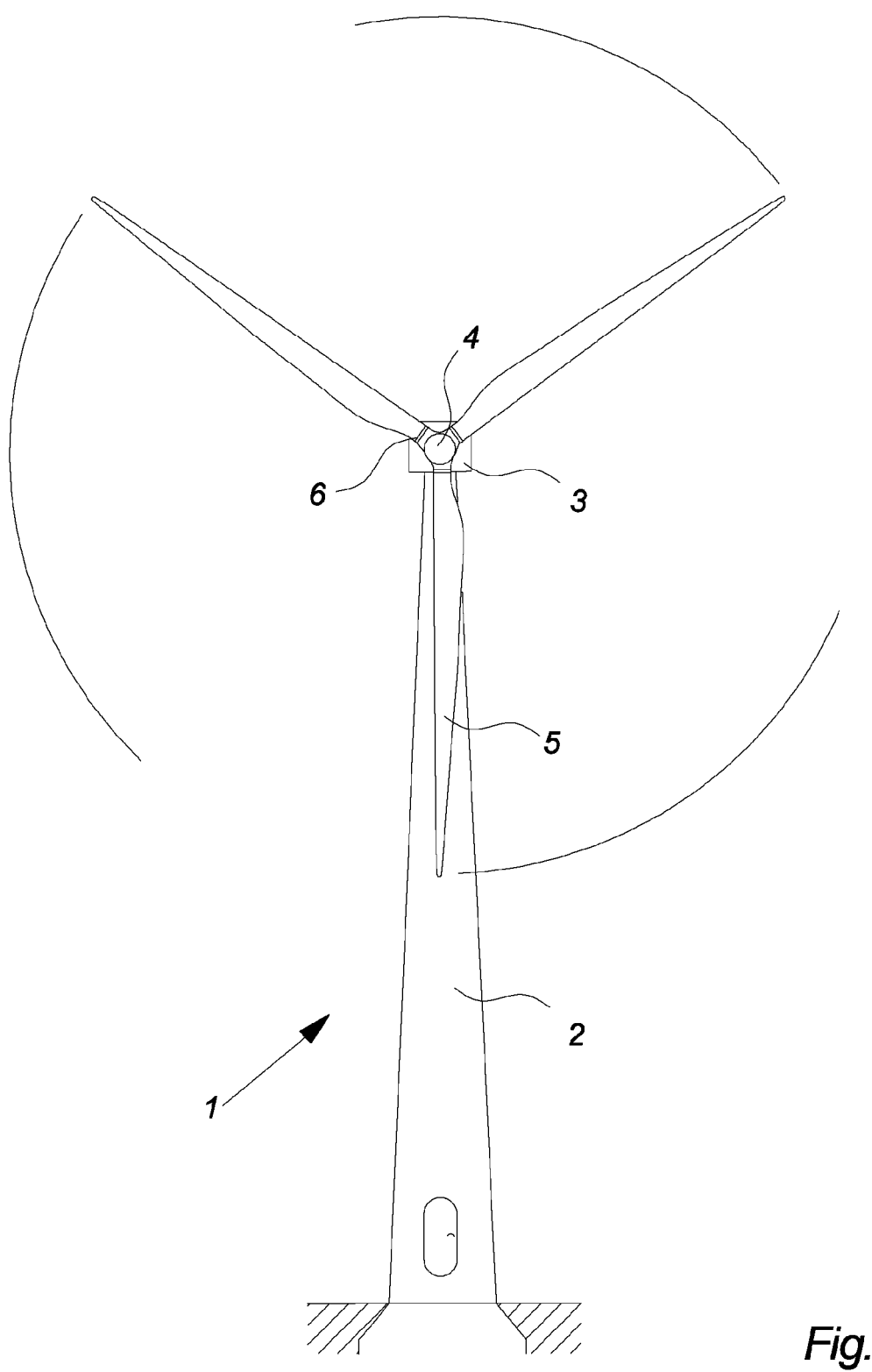
FIG. 1 illustrates a large modern wind turbine including three wind turbine blades in the wind turbine rotor.

FIG. 1 illustrates a modern wind turbine 1 with a tower 2 and a wind turbine nacelle 3 positioned on top of the tower.

The wind turbine rotor, comprising at least one blade such as three wind turbine blades 5 as illustrated, is connected to the hub 4 through pitch mechanisms 6. Each pitch mechanism includes a blade bearing and pitch actuating means which allows the blade to pitch. The pitch process is controlled by a pitch controller.

As illustrated in the figure, wind over a certain level will activate the rotor and allow it to rotate in a perpendicular direction to the wind. The rotation movement is converted to electric power which usually is supplied to the utility grid as will be known by skilled persons within the area.

One main task for pitch mechanisms 6 of a wind turbine is to turn the rotor blades 5 around their length and for various embodiments of wind turbines the pitch systems are hydraulic systems.

For other embodiments of wind turbines the pitch systems are electric systems.

Figure 2:
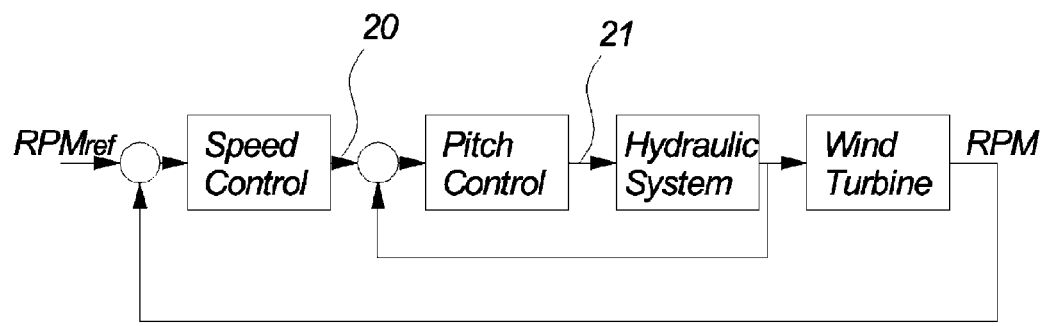
FIG. 2 illustrates schematically a functional diagram of a control system for various embodiments of a wind turbine.

FIG. 2 illustrates schematically a functional diagram of a control system for various embodiments of a wind turbine.

The speed control is for various embodiments a PI controller in the outer loop of the control structure.

In one operating mode the aim of the controller is to keep the generated power at a nominal rated level e.g. by maintaining a substantially constant generator speed i.e. a generator speed reference setpoint $RPM_{ref}$ is kept constant. This requires the inner pitch control loop to be an active control part and for alternating wind conditions/situations the pitch reference 20 may change rapidly. If the pitch control is out of track with the pitch reference signal 20 the rotor of the wind turbine may speed up contrary to the desired.

Figure 3:
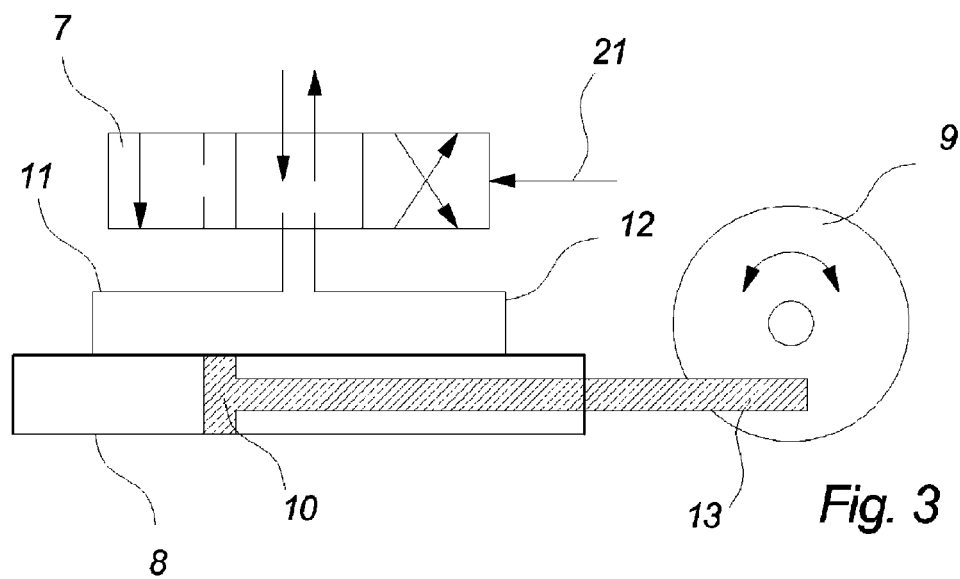
FIG. 3 illustrates schematically a hydraulic pitch actuator system for one rotor blade.

As illustrated schematically on FIG. 3, one embodiment of a hydraulic pitch actuator known in the art comprises a valve 7 and a cylinder 8. The operation of the valve 7 is controlled by a pitch actuator control signal 21 received from a pitch controller. The valve and cylinder are connected by hydraulic hoses 11, 12.

By changing the pressure on either side of a piston 10 in a hydraulic chamber of the cylinder 8, the piston is moved back and forth in said chamber.

The distal end of the piston shaft 13 is attached to the base of the rotor blade 9 and is thus able to turn the blade 5 around its own longitudinal axis.

For one embodiment of a hydraulic pitch actuator as described, FIG. 4a illustrates schematically the relation between the input voltage and the output pitch velocity. The hydraulic response curve 14 shows a considerable deadband 15 for relative small control voltage levels around 0 V i.e. said small voltage levels will substantially not move the piston and hereby change the pitch angle of the connected rotor blade.

Furthermore FIG. 4a illustrates that the slope of the response curve 14 outside of the deadband zone 15 is not linear.

A known technique to at least partly compensate for said non-linearities is to add a related gain compensation which has an increased gain around the deadband as illustrated in FIG. 4b. The gain compensation is fixed in time and may be either fixed or calibrated e.g. at the time of installation and/or at time of service.

One example of a compensated hydraulic response curve 19 of the pitch system is illustrated in FIG. 4c.

However, the operating conditions and disturbances of pitch systems vary in an unknown fashion. For instance for a hydraulic pitch system, the valve 7, hydraulic oil and load parameters may vary significantly e.g. due to slow changes or static disturbances such as ageing, temperature variations, variations in the mounting of the blade bearings causing variations in the bearing friction, hydraulic valve production variations etc.

Furthermore dynamic or relative fast disturbances such as wind loads, air density etc. also has a major influence on the overall response of the pitch system.

Figure 5:
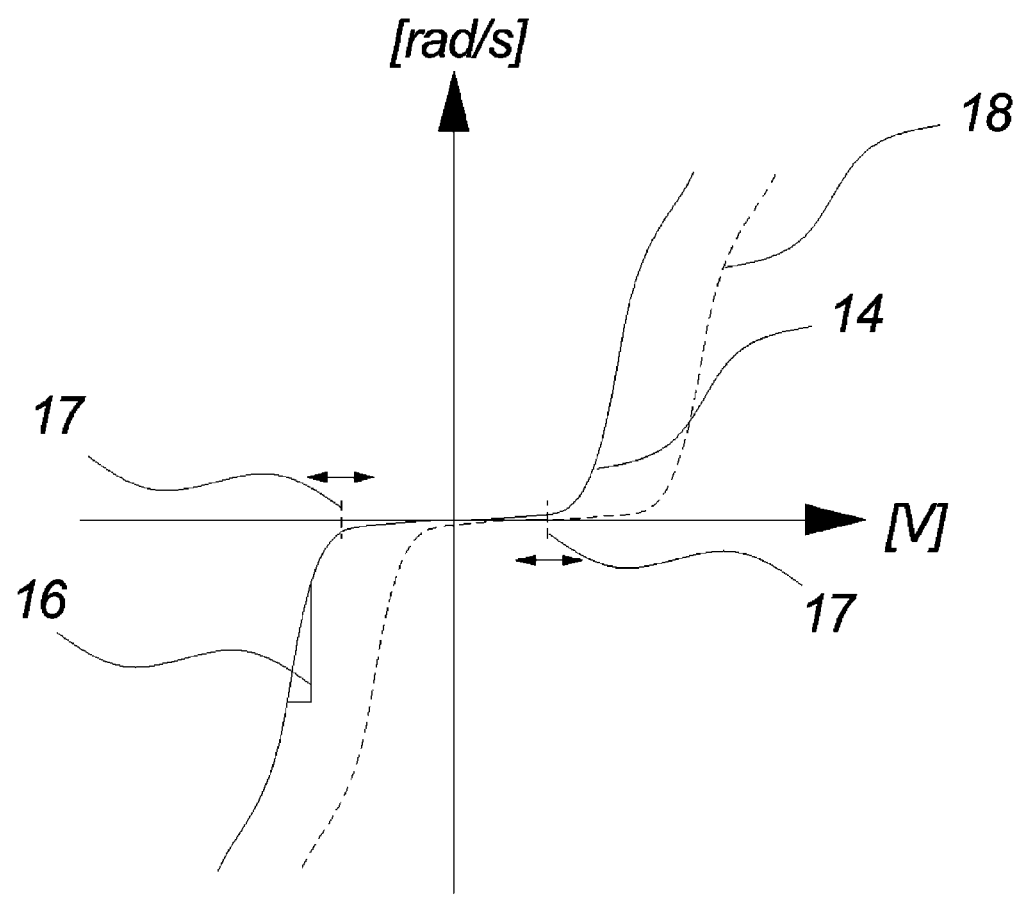
FIG. 5 illustrates schematically examples of changes on a hydraulic response characteristic.

FIG. 5 illustrates schematically examples of how characteristics of the hydraulic response curve may change e.g. due to the mentioned disturbances.

For various situations the deadband limits 17 may vary as indicated by arrows on the figure, either individual or related, resulting in narrowing or broadening of the deadband zone. Furthermore a variation in offset of the hydraulic response curve may occur as illustrated by 18 in the figure. Even further the slope 16 of the hydraulic response curve 14 may vary as well as the curve form.

These changes demands that said gain compensation are changed accordingly in order to keep a substantially unchanged compensated hydraulic response curve 19.

Thus any conventional approach to pitch control without considering the variation of said operation conditions and load disturbances can not obtain an optimal performance.

It is therefore required that the wind turbine can be controlled in a manner that compensates for the mentioned varying operation conditions and disturbances.

According to the present invention the pitch system of a wind turbine comprises a compensation controller to compensate for disparities in the pitch system. Furthermore operational parameters of the compensation controller can be changed during operation.

By introducing a compensation controller to compensate for disparities in the pitch system, the above mentioned disadvantages of conventional approach to pitch control can be minimized, which in turn results in optimized operation of the pitch system and minimized wear of various wind turbine components.

By being able of changing operational parameters of the compensation controller during operation, it can be assured that characteristics of the compensation controller can be altered to desired operation modes and/or responses to input parameters.

As an example of an altered operation mode for the compensation controller can be altered gain within a hydraulic deadband i.e. alternating the slope of the curve schematically depicted in FIG. 4b.

According to a preferred embodiment of the invention said compensation controller comprises an adaptive controller. In the context of the present invention, said adaptive controller is regarded as a controller with adjustable parameters and a mechanism for adjusting said parameters.

An adaptive controller may provide continuous adaptation to dynamic changes of the controlled system i.e. parameters of the controller change dependent on system parameter changes e.g. due to non-linearity of the system in more working points. In other words the adaptive controller changes the system control settings so that its behavior responds to requirements.

For various embodiments of an adaptive controller, the control algorithm requires no a priori information regarding the controlled system and is able to choose the optimal structure and parameters of the adaptive algorithms e.g. based on continuous measurements of system values.

Figure 6:
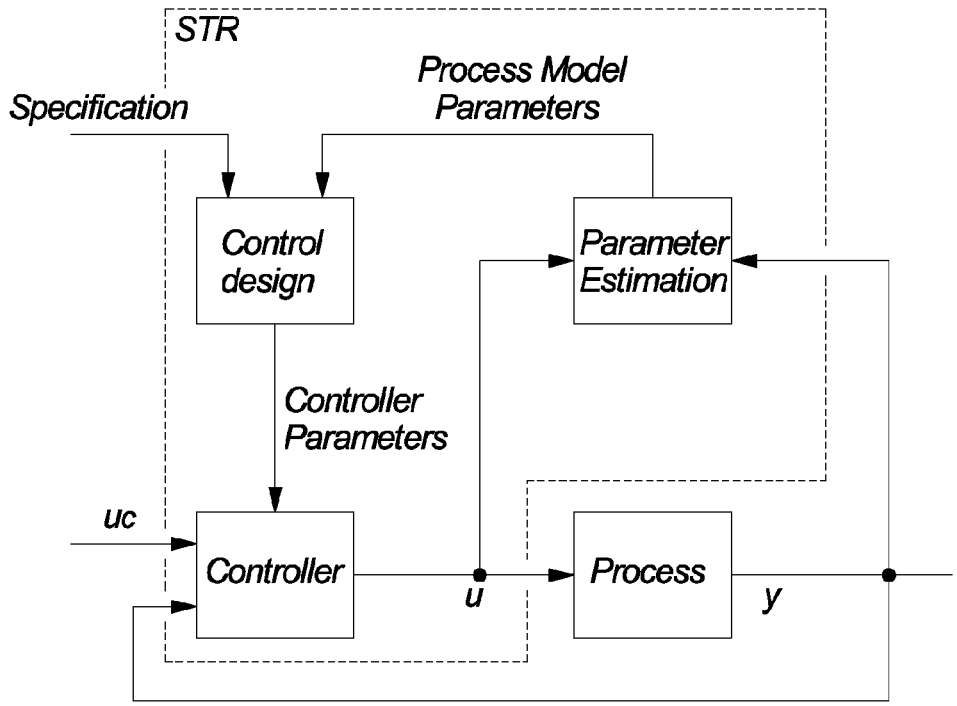
FIG. 6 illustrates schematically a block diagram of a Self Tuning Regulator (STR) according to one embodiment of the invention.

According to one preferred embodiment of the present invention, said compensation controller comprises a Self Tuning Regulator (STR). FIG. 6 illustrates such STR.

The STR comprises two loops:

An lower loop that contains the process and an ordinary feedback controller.

An upper loop which is composed by a parameter estimator and design calculations. This loop adjusts the controller parameters.

Further the adaptive process comprises tow steps:

1—Estimate process model parameters.

2—Update controller parameters as if estimates were correct.

For various embodiments of said STR, the process model parameter estimation uses a non-recursive parameter estimation algorithm.

For one embodiment of said STR, said non-recursive estimation of process model parameters is a Least Square (LS) algorithm.

For another embodiment of said STR, said non-recursive estimation of process model parameters is an Extended Least Square (ELS) algorithm.

For other embodiments of said STR, the process model parameter estimation uses a recursive parameter estimation algorithm.

For one embodiment of said STR, said recursive estimation of process model parameters uses a Recursive Least Square (RLS) algorithm.

For another embodiment of said STR said recursive estimation of process model parameters uses a Recursive Extended Least Square (RELS) algorithm.

For yet another embodiment of said STR, said recursive estimation of process model parameters uses a Recursive Maximum Likelihood (RML) algorithm.

For an even further embodiment of said STR, said recursive estimation of process model parameters uses a Stochastic Approximation (STA) algorithm.

For one embodiment of said STR, the control design model uses a LQ tracking optimal control method.

For another embodiment of said STR, the control design model uses input-output pole placement design method.

Figure 7:
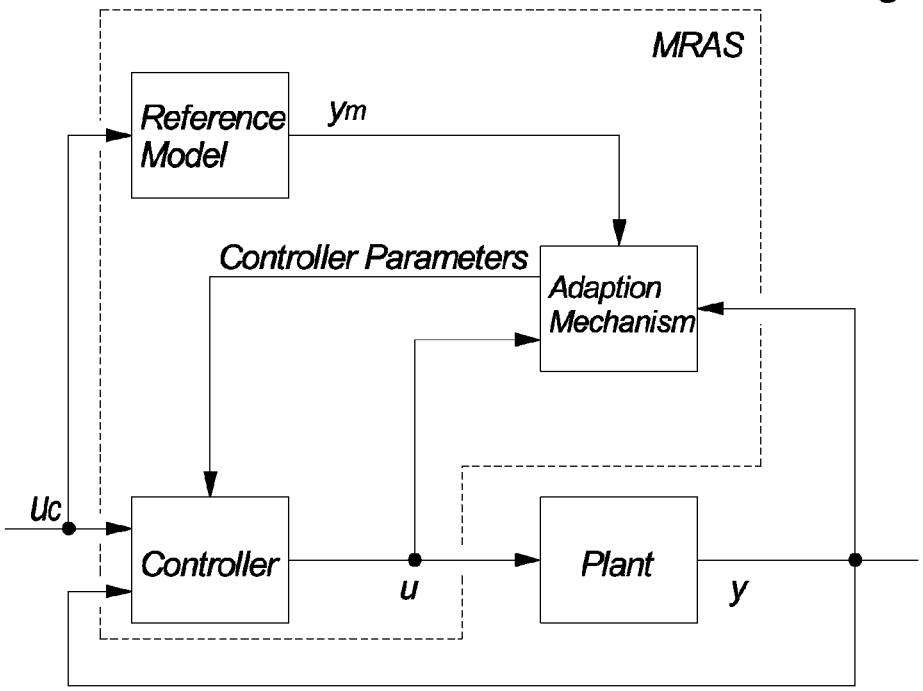
FIG. 7 illustrates schematically a block diagram of a Model Reference Adaptive System (MRAS) according to one embodiment of the invention.

According to another preferred embodiment of the present invention, said compensation controller comprises a Model Reference Adaptive System (MRAS). FIG. 7 illustrates such MRAS.

By applying a MRAS control, a process inherits the behavior of a desired reference model. The reference model is designed to fulfill the objectives of the system. The idea of MRAS is to make a real-time update of the parameters of the controller and thus remove the error between the reference model and the process. The real-time parameter updating can be achieved e.g. using MIT or Lyapunov methods.

FIG. 7 illustrates how controller parameters are updated by the adjustment mechanism on the basis of the output y and input u of the plant and the model reference input.

The MRAS can handle linear as well as non-linear systems.

As an example the MIT rule is a method for updating controller parameters θ of the controller, based on minimizing the loss function:

$$J(\theta) = \frac{1}{2}e^2$$

where $e=y-y_m$ i.e. the error between model and process output.

The MIT rule is defined as $$\frac{d\theta}{dt} = -\gamma \frac{\partial J}{\partial \theta} = -\gamma e \frac{\partial e}{\partial \theta},$$

where γ is an adaption gain defined by the user that expresses how fast the error converges to zero.

For various embodiments of the present invention, parameters of the adaptive controller can be changed continuously.

For another embodiment said parameters can be changed for a fixed period of time or changed until a defined error parameter is below a predefined level.

For various embodiments said adaptive controller can be initiated to change its parameters either manually such as at installation, at service, at changing environmental conditions etc. or automatically such as scheduled at predefined time intervals.

Figure 8:
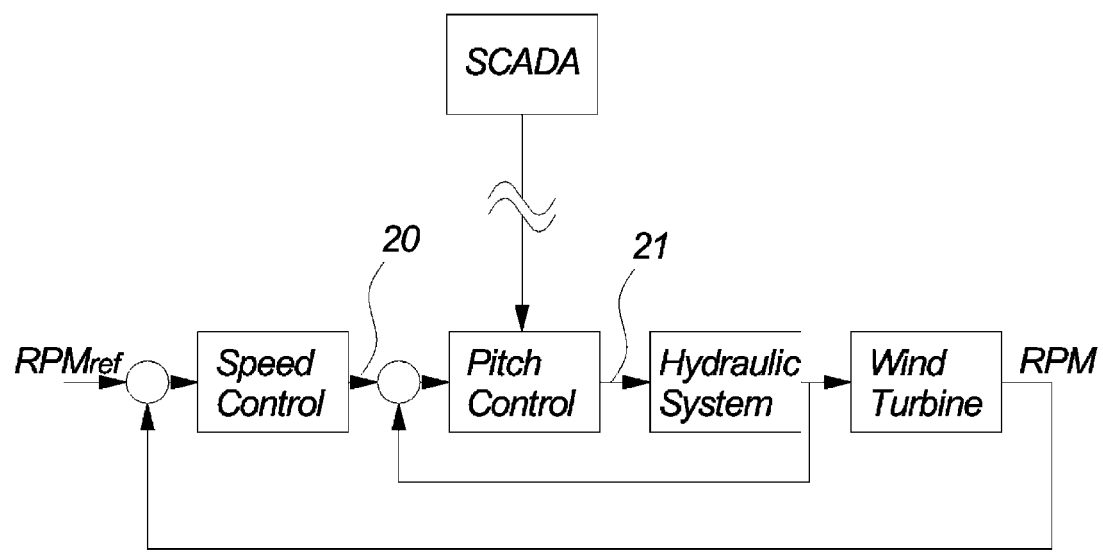
FIG. 8 illustrates schematically a pitch controller according to one embodiment of the invention connected to a SCADA system.

In yet various embodiments of the invention as illustrated schematically in FIG. 8, said adaptive controller can be initiated to change its parameters manually e.g. via a connected SCADA-connection.

The invention also relates to wind turbines comprising electrical pitch systems.

What is claimed is:

1. A wind turbine comprising
a rotor including one or more rotor blades,
a pitch system for controlling a pitch angle of said one or more rotor blades, said pitch system comprising at least one pitch actuator, a pitch controller for generating pitch actuator control signals and sensor elements for establishing values of pitch performance parameters, and
an adaptive compensation controller to compensate for disparities between a model defined by said pitch actuator control signals and said values of pitch performance parameters, according to a control algorithm,
wherein
the adaptive compensation controller is arranged to adjust parameters of the control algorithm of said adaptive compensation controller in dependency of said disparities.

2. The wind turbine according to claim 1, wherein said adaptive compensation controller comprises a Self Tuning Regulator (STR).

3. The wind turbine according to claim 1, wherein the adaptive compensation controller is arranged to adjust said parameters of the control algorithm continuously.

4. The wind turbine according to claim 1, wherein said pitch actuator is a hydraulic pitch actuator.

5. The wind turbine according to claim 1, wherein said adaptive compensation controller is further arranged to adjust said parameters of the control algorithm in dependency of environmental values.

6. The wind turbine according to claim 1, wherein said adaptive compensation controller is further arranged to adjust said parameters of the control algorithm in dependency of pitch performance parameters.

7. The wind turbine according to claim 1, wherein said adaptive compensation controller is arranged to adjust said parameters of the control algorithm in dependency of estimated pitch performance parameters.

8. The wind turbine according to claim 1, wherein said wind turbine is a variable speed wind turbine.

9. Method for compensating for disparities in a wind turbine rotor blade pitch system, said pitch system comprising at least one pitch actuator, a pitch controller, sensor elements and an adaptive compensation controller, said method comprising the steps of:

generating pitch actuator control signals by said pitch controller establishing values of pitch performance parameters of said pitch actuator by said sensor elements, adjusting parameters of a control algorithm of said adaptive compensation controller in dependency of disparities between a model defined by said generated pitch actuator control signals and said established values of pitch performance parameters.

10. The method according to claim 9, wherein said parameters of a control algorithm are further adjusted in dependency of environmental values.

11. The method according to claim 9, wherein said parameters of a control algorithm are further adjusted in dependency of performance parameters.

12. The method according to claim 9, wherein said established values of pitch performance parameters are based on estimated values.

13. The method according to claim 9, wherein said established values of pitch performance parameters are based on measured values.

14. Use of a method according to claim 9 in a pitch controlled wind turbine.

* * * * *

UNITED STATES PATENT AND TRADEMARK OFFICE
CERTIFICATE OF CORRECTION

Page 1 of 1

PATENT NO. : 7,942,634 B2
APPLICATION NO. : 12/687671
DATED : May 17, 2011
INVENTOR(S) : Poul B. Christensen It is certified that error appears in the above-identified patent and that said Letters Patent is hereby corrected as shown below:

In the Specification:

At column 4, line number 2, change "is" to --are--.

At column 6, line number 15, change "has" to --have-- and at line number 27, change "demands" to --demand-- and change "are" to --is-- and at line number 47, change "of changing" to --to change--.

At column 7, line number 10, change "An" to --A-- and at line number 15, change "tow" to --two--.

Signed and Sealed this
Second Day of August, 2011

David J. Kappos
*Director of the United States Patent and Trademark Office*